W. A. Myers,
Horse Rake.

No. 113,552.  Patented Apr. 11, 1871.

Witnesses.
Joel Peyton
Baltis De Long

Wm. A. Myers
by his atty
Wm. D. Baldwin

UNITED STATES PATENT OFFICE.

WILLIAM A. MYERS, OF YORK, PENNSYLVANIA.

IMPROVEMENT IN HORSE HAY-RAKES.

Specification forming part of Letters Patent No. 113,552, dated April 11, 1871.

*To all whom it may concern:*

Be it known that I, WILLIAM A. MYERS, of the borough and county of York, in the State of Pennsylvania, have invented certain new and useful Improvements in Horse-Rakes, of which the following is a specification:

The first part of my invention relates to the teeth; and the improvement consists in mounting independent spring-teeth in pairs in a bracket on the axle, which bracket has sockets to receive the teeth, and guides to control their movements, as hereinafter explained. My improvement further consists in combining rake-teeth, oscillating on the cranked axle of the supporting-wheels, a draft-frame hinged beneath said axle, and carrying clearing-teeth, and a seat for the driver, and a pressure-lever or treadle pivoted on the axle to hold down the teeth at pleasure.

Figure 1:
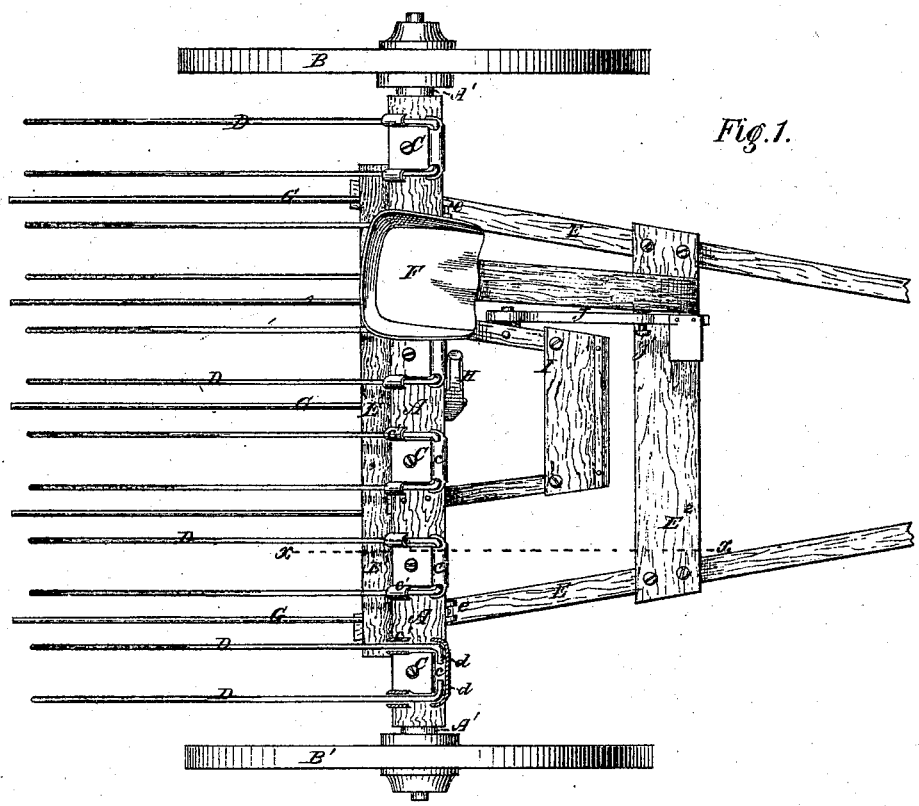
Figure 2:
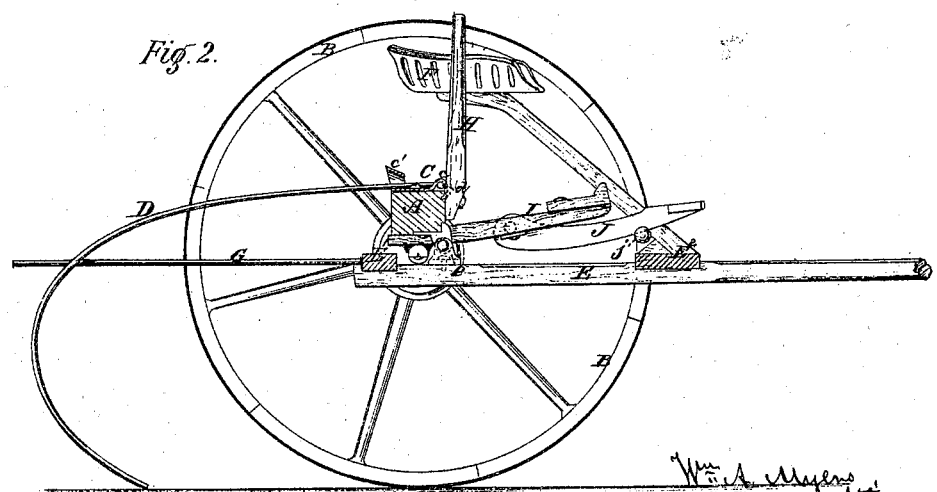

In the accompanying drawings of my improved horse-rake, Figure 1 is a plan; Fig. 2, a vertical longitudinal section through the line $x\ x$ of Fig. 1.

An axle-tree, A, (by preference of wood,) has a bracket, $A^1$, secured to its under side at each end. A spindle or arbor, $A^2$, of simple round iron, fits into a concave groove on the under side of the bracket. The wheels B B' turn loosely on these spindles. Socket-plates C, having sockets $c$ and guides $c'$ formed in them, are secured upon the upper side of the axle-tree. The teeth D of the rake are bent horizontally inward at their upper ends, as at $d$, Fig. 1, and inserted into the socket-plates, as shown. These plates may be of cast, malleable, or wrought metal, and are cheaply made. As the sockets and guides are open below, the teeth can readily be placed in them. The plates are then secured to the axle by screws. The parts are thus easily and quickly secured in place, are firmly held in their proper relation, and can be easily removed or replaced when desired. The guides $c'$ restrain the lateral deflection of the teeth, but allow each one a limited amount of vertical play independently of its fellows. The draft-frame is composed of two shafts, E, united, in rear of the axle, by a cross-brace, $E^1$, and in front by a similar brace, $E^2$. This frame is pivoted to the axle by lugs $e$ on the under front corner of the main axle, and eccentrically to the axis of the wheels. Clearing-teeth G project backward from the draft-frame. A seat, F, for the driver is mounted on the draft-frame. The axle may be rocked by a hand-lever, H, thereon, or by a foot-lever, I, both of these levers being in easy reach of the driver. A link or pressure lever, J, pivoted at its rear end to the lever I, extends forward, and rests on an arm, $j$, projecting from the standard which supports the driver's seat, or on the draft-frame. This lever serves to regulate the pressure of the teeth upon the ground, and is operated by the foot of the driver.

As the driver is mounted on the draft-frame, and as this frame is hinged in front of the axis of the wheels, the weight of the driver aids in tilting the axle, and causes the teeth easily and quickly to rise.

I claim as my invention—

1. The socket-plates constructed as described, with open sockets $c$ and open guides $c'$ to receive the rake-teeth, so that each pair of teeth may be clamped to the axle by a single screw, and the teeth can be separated by removing the socket-plate from the axle.

2. The combination of the cranked axle, the rake-teeth, mounted on top of said axle, the draft-frame, hinged to the under front corner of the axle, the clearing-teeth and driver's seat, mounted on the draft-frame, and the pressure-lever, pivoted to the foot-lever, and resting on the draft-frame, all these parts being constructed and operating as described.

3. The pressure-lever pivoted to the foot-lever, and resting on the draft-frame, as described.

In testimony whereof I have hereunto subscribed my name.

WILLIAM A. MYERS.

Witnesses:
 JOHN H. SPHOR,
 JNO. A. METZELL.